No. 693,181. Patented Feb. 11, 1902.
J. L. SPENCER.
MOTOR VEHICLE FRAME.
(Application filed Aug. 8, 1901.)
(No Model.) 2 Sheets—Sheet 1.
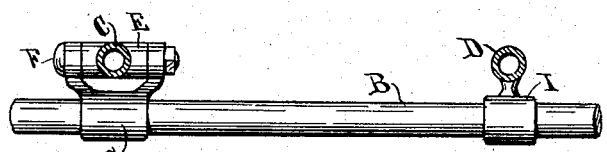
Fig. 2.
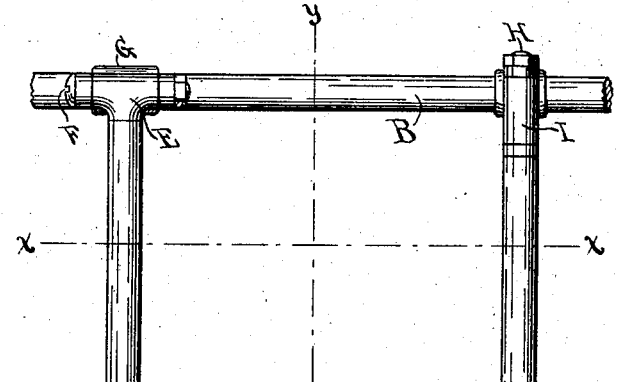
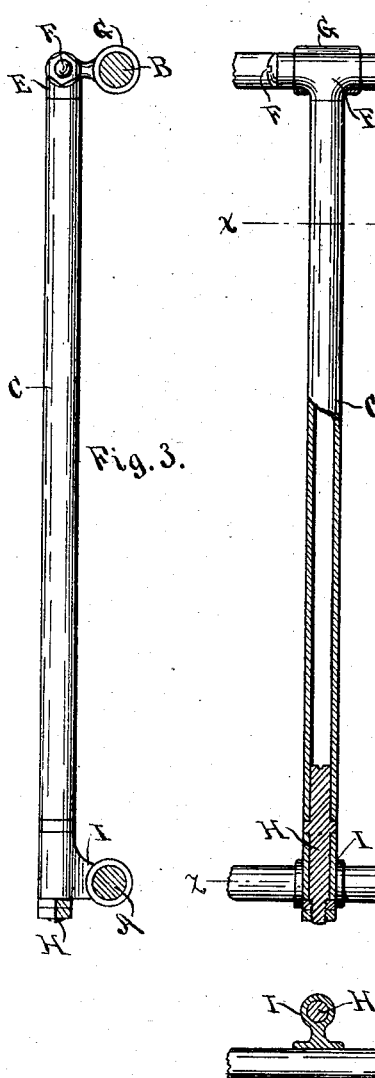
Fig. 4.
WITNESSES:
M. E. Verbeck.
Edith L. Miller
INVENTOR
John L. Spencer
BY
Eugene Diven
ATTORNEY No. 693,181. Patented Feb. 11, 1902.
J. L. SPENCER.
MOTOR VEHICLE FRAME.
(Application filed Aug. 8, 1901.)
(No Model.) 2 Sheets—Sheet 2.
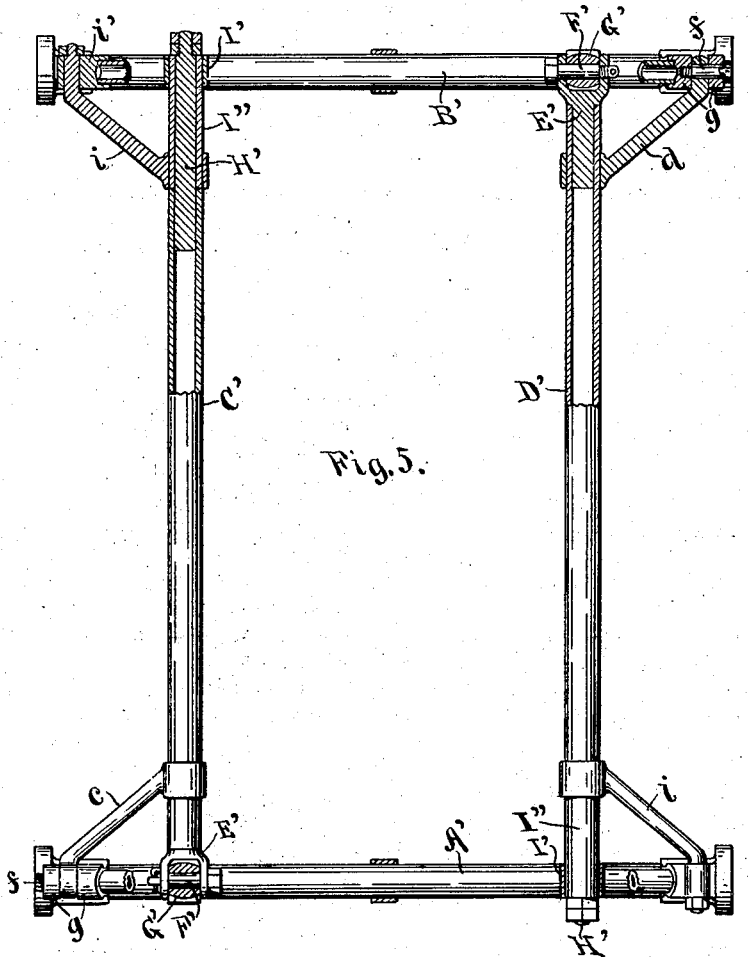
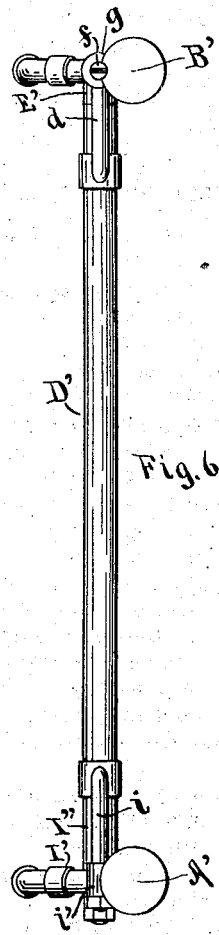
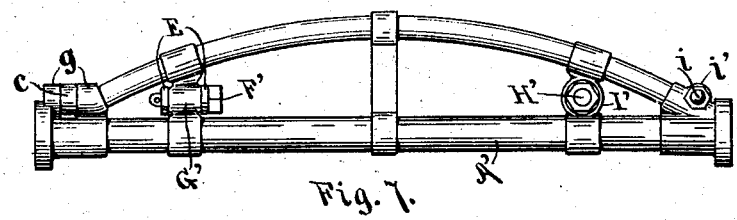
WITNESSES:
M. E. Verbeck.
Edith L. Miller
INVENTOR
John L. Spencer
BY Eugene Diven
ATTORNEY

UNITED STATES PATENT OFFICE.

JOHN L. SPENCER, OF ELMIRA HEIGHTS, NEW YORK, ASSIGNOR OF ONE-HALF TO LE ROY TABOR, OF ELMIRA, NEW YORK.

MOTOR-VEHICLE FRAME.

SPECIFICATION forming part of Letters Patent No. 693,181, dated February 11, 1902.

Application filed August 8, 1901. Serial No. 71,340. (No model.)

*To all whom it may concern:*

Be it known that I, JOHN L. SPENCER, a citizen of the United States, residing at Elmira Heights, in the county of Chemung and State of New York, have invented a new and useful Improvement in Motor-Vehicle Frames, of which the following is a specification.

My invention relates to improvements in the frames or running-gears for vehicles, and more particularly to such as are adapted for self-propelling vehicles.

The object of my invention is to provide a frame of simple, cheap, and strong construction which shall have its parts so articulated that the frame will readily accommodate itself to irregularities in the roads over which the vehicle is propelled, the wheels and axles being thereby maintained in proper running relation.

I attain my object by means of the construction illustrated in the accompanying drawings, in which I have shown my invention as applied both to a simple and to a truss frame, and in which—

Figure 1 is a plan view of a simple frame embodying my improvements; Figs. 2, 3, and 4, transverse sections on the lines X X, Y Y, and Z Z, respectively, in Fig. 1; and Figs. 5, 6, and 7, a plan view and side and end elevations, respectively, of my improvements as applied to a trussed and braced frame, certain parts in Figs. 1 and 5 being broken away in order to show the details of construction.

Similar letters refer to like parts in the several views.

Referring to Figs. 1 to 4, inclusive, A and B represent forward and rear axles, which may be either solid or tubular. C and D represent the side bars or reaches, and it is the manner of coupling these reaches to the axles which comprises my invention. E represents a coupling-head which is brazed or otherwise suitably attached to the reach C where it is coupled to the axle B. The coupling-head E is fastened by means of the pin F to the yoke G, which is secured to the axle B, as shown in Figs. 2 and 3, the pin F being placed parallel to said axle. At the other end of reach C, where it couples to the axle A, is fastened a pin H, which pin is journaled in the sleeve I, secured to the axle A, as shown in Figs. 3 and 4, the pin H being held in the sleeve I by means of jam-nuts or other suitable devices, as indicated. The reach D is provided with coupling parts precisely the same as those described for the reach C, with the exception that the position of the parts on the reach is reversed—that is to say, the sleeve I and pin H couple the reach D to the axle B, and the coupling-head E, pin F, and yoke G couple it to the axle A. It will thus be seen that each reach is coupled to the axles by hinge-joints parallel to the axles at one end and transverse to the axles at the other, these parallel and transverse hinge-joints being arranged in reverse order on the two reaches, and it will be readily apparent that by reason of such arrangement the tilting of one axle with reference to the other as the wheels run over uneven roadways will be accommodated by the play of the reaches in their respective couplings and the strain on the frame which would otherwise result will be relieved. While this construction allows for the necessary flexibility of the frame in its horizontal plane, the couplings are of such a nature that the axles will be maintained at all times in parallel vertical planes and firmly held from twisting in the couplings or tilting to the front or rear.

It will be understood that the reaches C and D may be placed either above the axles or dropped below them by means of the coupling parts G and I, and also where it is desirable that one of the axles should rotate in driving the vehicle that that axle shall be journaled in suitable ball or roller bearings in the coupling parts G and I.

In Figs. 5, 6, and 7 I have shown a frame in which the axles are trussed and the reaches braced, the parts being coupled together upon the same principles as above described. A' and B' represent the axles, which have curved truss-bars fastened in suitable socket-pieces at the ends, as illustrated in Fig. 7. Reach C' where it couples to the axle A' is provided with a coupling-head E', which is forked to engage the coupling-piece G', attached at the bottom to the axle A' and at the top to the truss-bar, a pin F' coupling the parts E' and G' together at a point between the axle and the truss-bar, as shown more particularly in Fig. 7. Projecting outwardly from this end of the reach C' is a brace c, which is hinged at g upon a pin f, which pin is in alinement with the pin F'. At the other end the reach C' where it couples to the axle B' is provided with a pin H', journaled in the sleeve I", which projects inwardly from the coupling-piece I', located between the axle B' and its truss-bar. The sleeve I" is provided with a brace i, which is secured to the axle B' at i'. The reach D' is coupled in like manner to the axles A' and B', the coupling parts, however, being in reverse order from those described in relation to reach C', and the operation of these parallel and transverse hinge-joints will be readily understood from what has gone before.

Having thus described my improvements, and without confining myself to the precise details of construction taken for illustration, what I claim as my invention, and desire to secure by Letters Patent, is—

1. A vehicle-frame comprising front and rear axles and two reaches connecting said axles, said reaches at one end being journaled in stationary sleeves set upon the axles at right angles thereto, and at the other end being provided with coupling-heads joined to the axles by pin connections set parallel to the axles, similar coupling devices being placed in reverse order on the respective reaches.

2. A vehicle-frame comprising front and rear axles and two straight reaches connecting said axles, said reaches at one end being journaled in stationary sleeves set transversely upon the axles in alinement with the reaches and at the other end being provided with coupling-heads joined to the axles by pin connections set parallel to the axles, similar coupling devices being placed in reverse order on the respective reaches.

3. A vehicle-frame comprising front and rear axles and two reaches connecting said axles, said reaches at one end being journaled in sleeves rigidly set upon the axles in a transverse position thereto with brace-bars running from the inner ends of the sleeves to the axles and rigidly connected therewith, and at the other end being provided with coupling-heads and brace-bars joined to the axles by pin connections set parallel to the axles and in alinement with one another, similar coupling devices being placed in reverse order on the respective reaches.

In testimony whereof I have affixed my signature in presence of two witnesses.

JOHN L. SPENCER.

Witnesses:
M. E. VERBECK,
EDITH L. MILLER.